United States Patent
Humphrey et al.

(10) Patent No.: US 6,742,826 B2
(45) Date of Patent: Jun. 1, 2004

(54) FIVE POSITION TAILGATE ASSEMBLY

(75) Inventors: Robert B. Humphrey, Tucson, AZ (US); George Counes, Vail, AZ (US)

(73) Assignee: J.R. Kennedy Co., Ltd., Tucson, AZ (US)

( * ) Notice: Subject to any disclaimer, the term of this patent is extended or adjusted under 35 U.S.C. 154(b) by 0 days.

(21) Appl. No.: 10/302,107

(22) Filed: Nov. 21, 2002

(65) Prior Publication Data

US 2003/0122396 A1 Jul. 3, 2003

Related U.S. Application Data

(63) Continuation-in-part of application No. 09/924,796, filed on Aug. 8, 2001, now abandoned.

(51) Int. Cl.[7] ............................................ B62D 33/00
(52) U.S. Cl. ........................ 296/51; 296/57.1; 49/192
(58) Field of Search .......................... 296/51, 50, 52, 296/57.1, 106, 146.8, 184; 49/192; 298/17.5, 17.6

(56) References Cited

U.S. PATENT DOCUMENTS

| | | | | | |
|---|---|---|---|---|---|
| 3,567,274 | A | * | 3/1971 | Kaptur, Jr. et al. | 296/57.1 |
| 3,690,035 | A | * | 9/1972 | Schindlauer et al. | 49/192 |
| 4,353,589 | A | * | 10/1982 | Hartberg | 296/50 |
| 4,790,589 | A | * | 12/1988 | Moore et al. | 296/50 |
| 5,273,339 | A | * | 12/1993 | Flynn | 296/57.1 |
| 5,641,262 | A | * | 6/1997 | Dunlop et al. | 296/51 |
| 5,673,960 | A | * | 10/1997 | Sorensen | 296/57.1 |
| 5,685,594 | A | * | 11/1997 | Harper | 296/51 |
| 5,711,569 | A | * | 1/1998 | Sovoda | 296/57.1 |
| 5,876,086 | A | * | 3/1999 | Lagrou et al. | 296/51 |

* cited by examiner

Primary Examiner—Lori L Coletta
(74) Attorney, Agent, or Firm—Dale F. Regelman

(57) ABSTRACT

A five-position tailgate assembly wherein a single user can conveniently configure that tailgate to employ one of five different orientations, including a configuration having a closed door assembly, a configuration having that door assembly rotated up to about 90 degrees downwardly to an open position, a configuration wherein that door assembly is rotated in a first direction up to about 180 degrees around a first vertical axis, a configuration wherein that door assembly is rotated in a second direction up to about 180 degrees around a second vertical axis, and a configuration wherein that door assembly is removed from the tailgate assembly.

14 Claims, 14 Drawing Sheets

FIG. 1

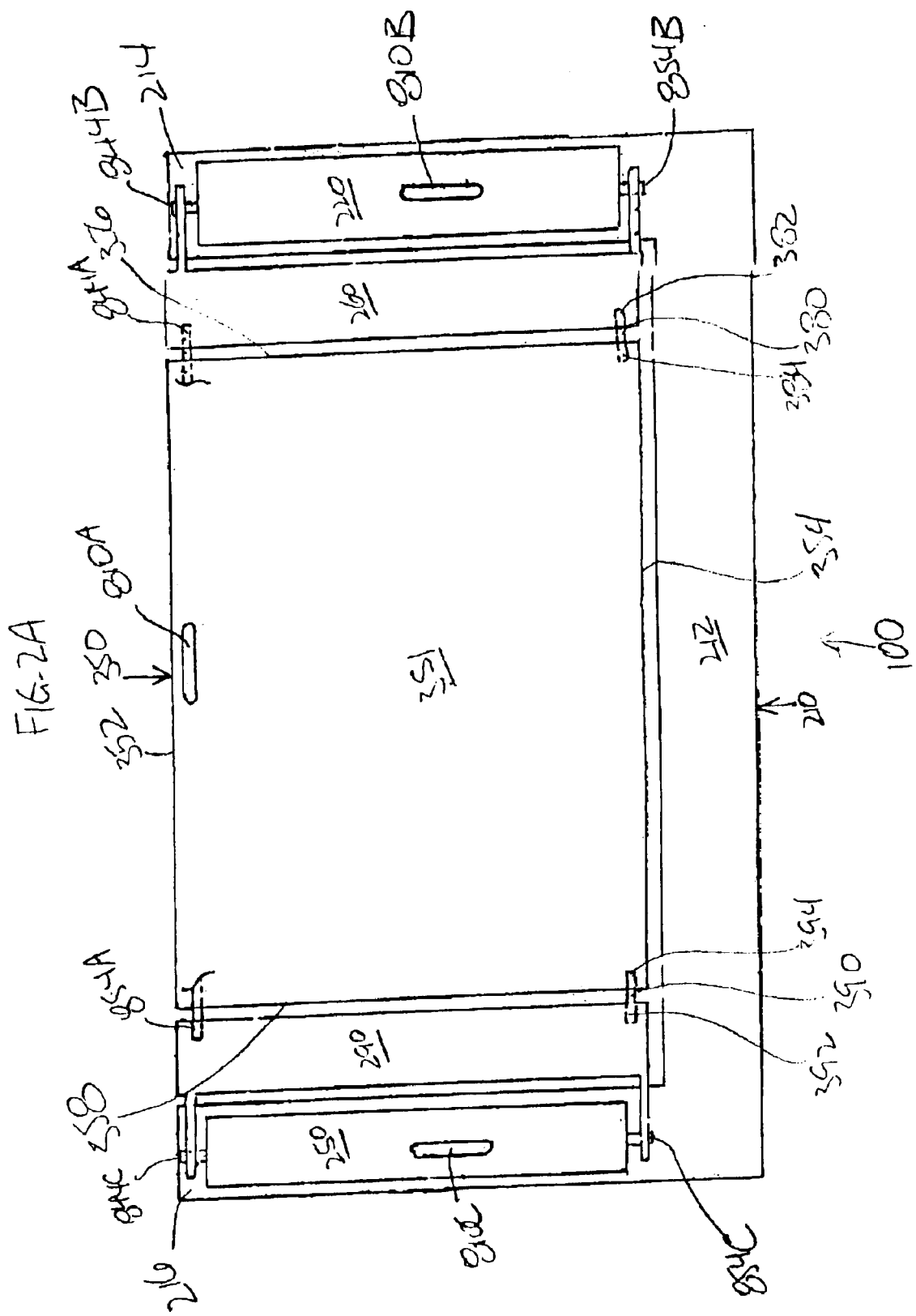

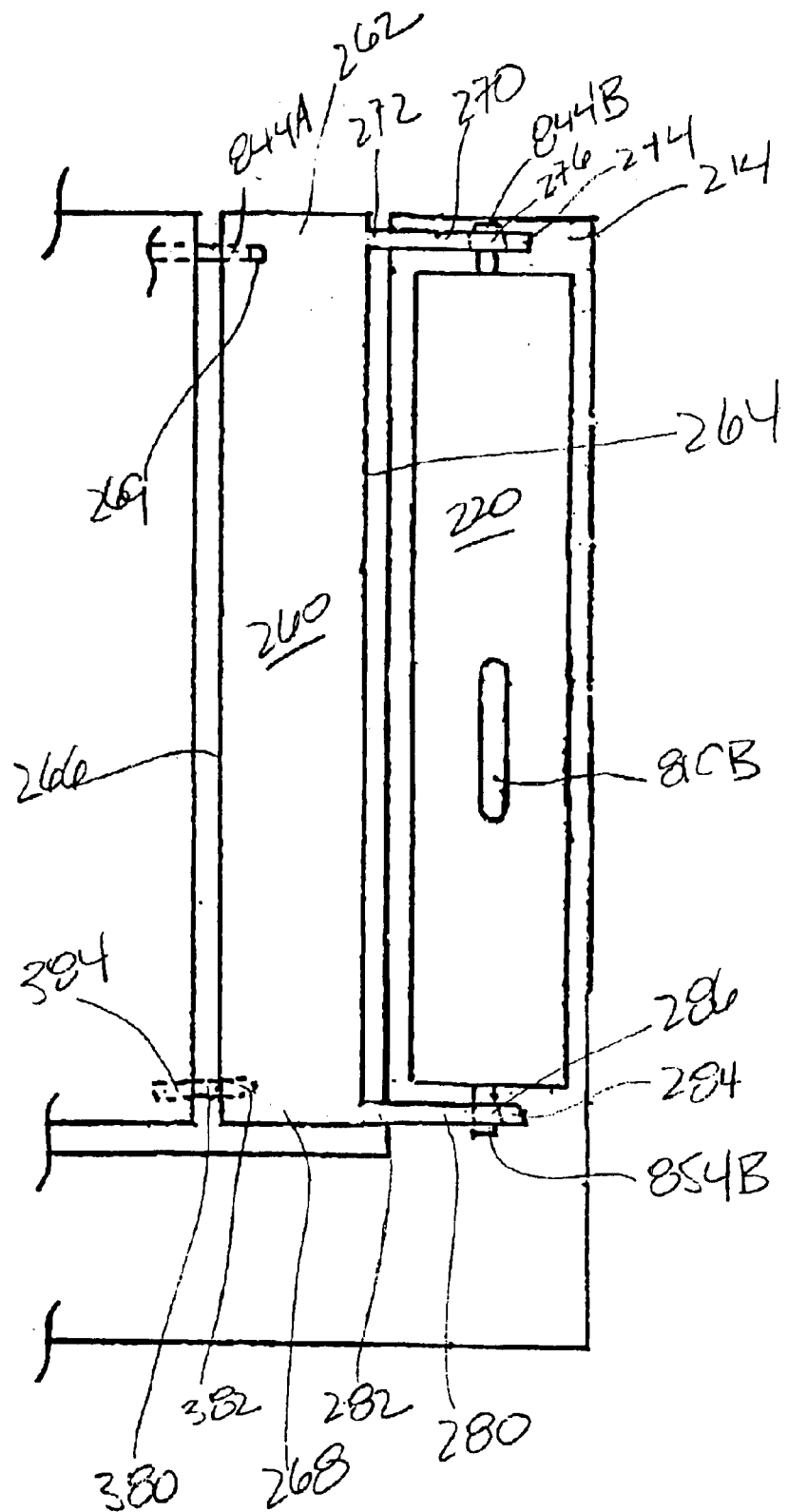

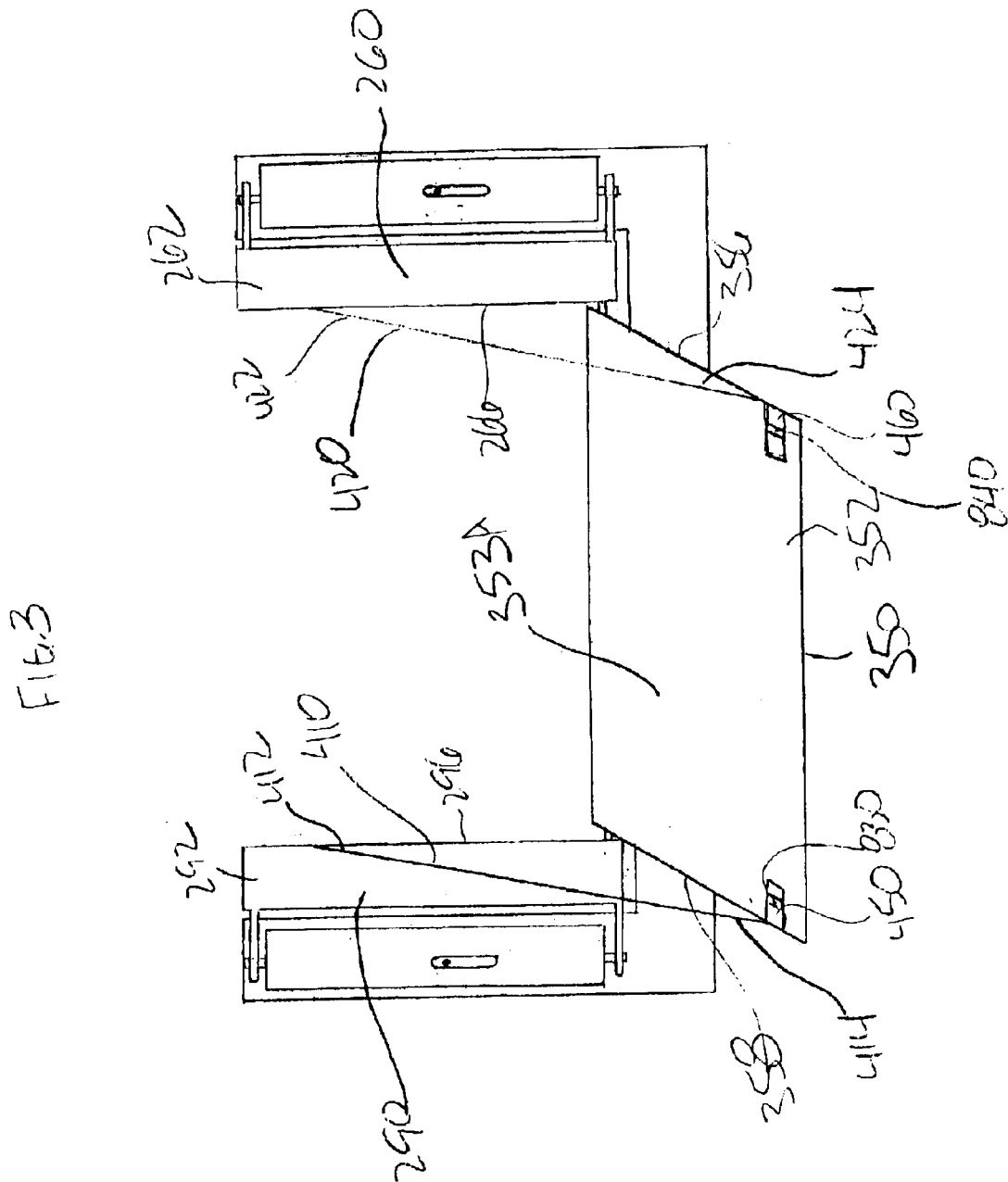

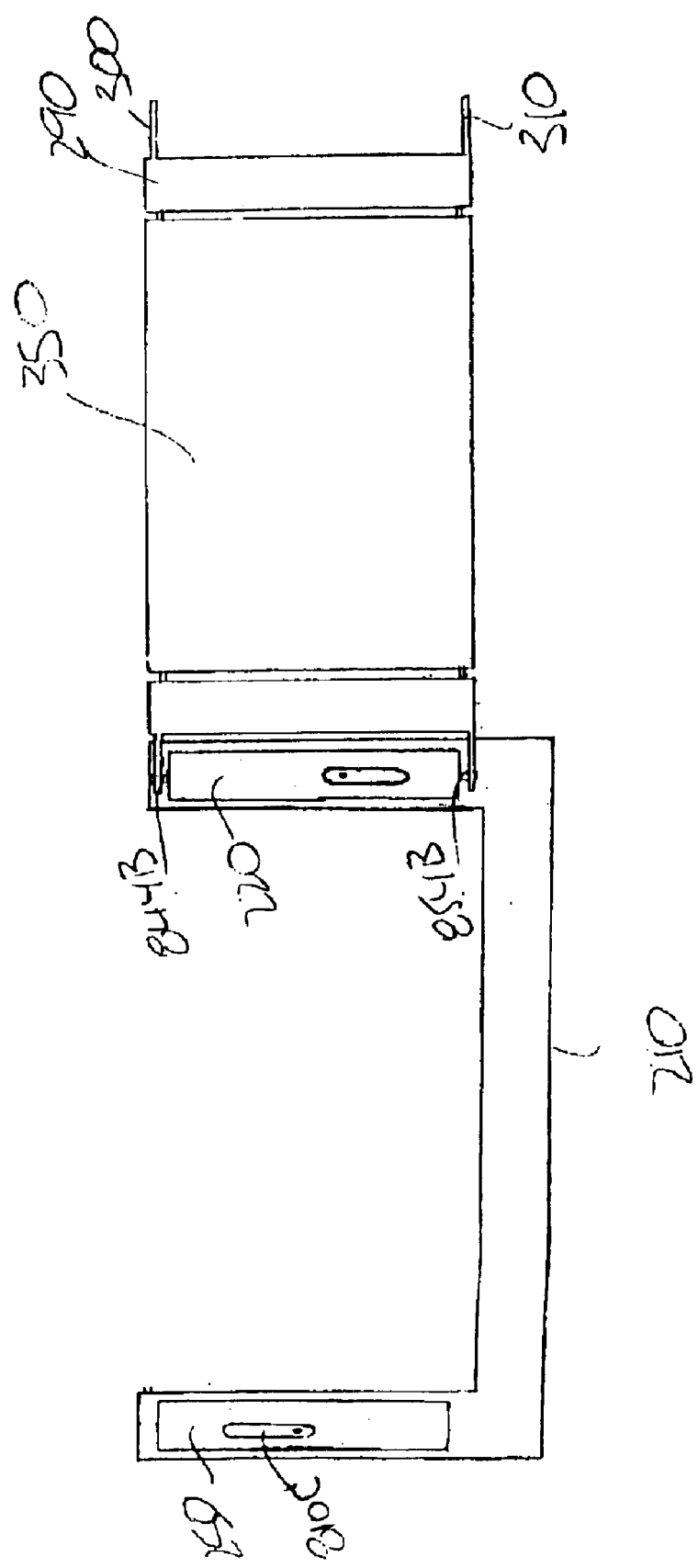

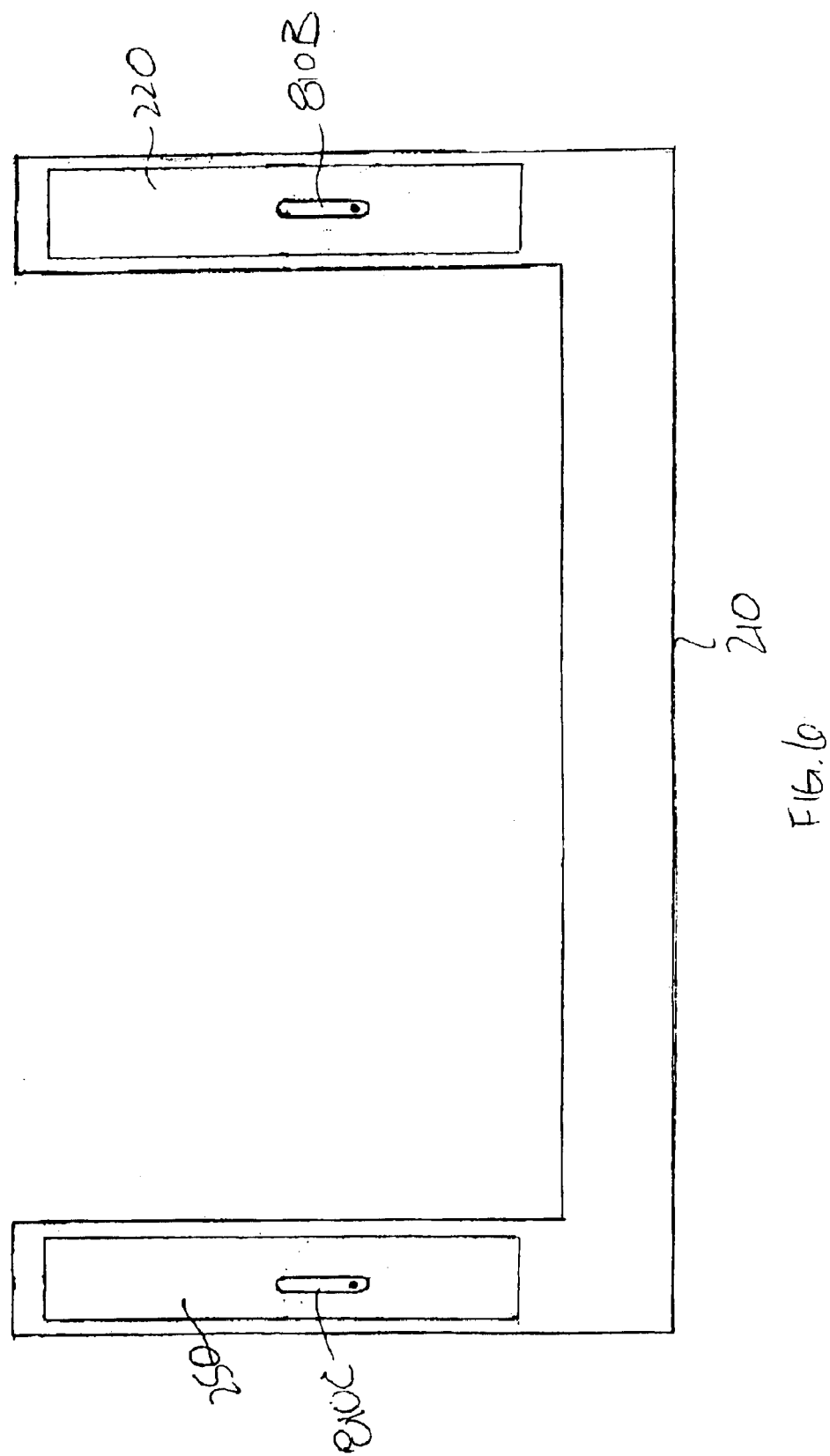

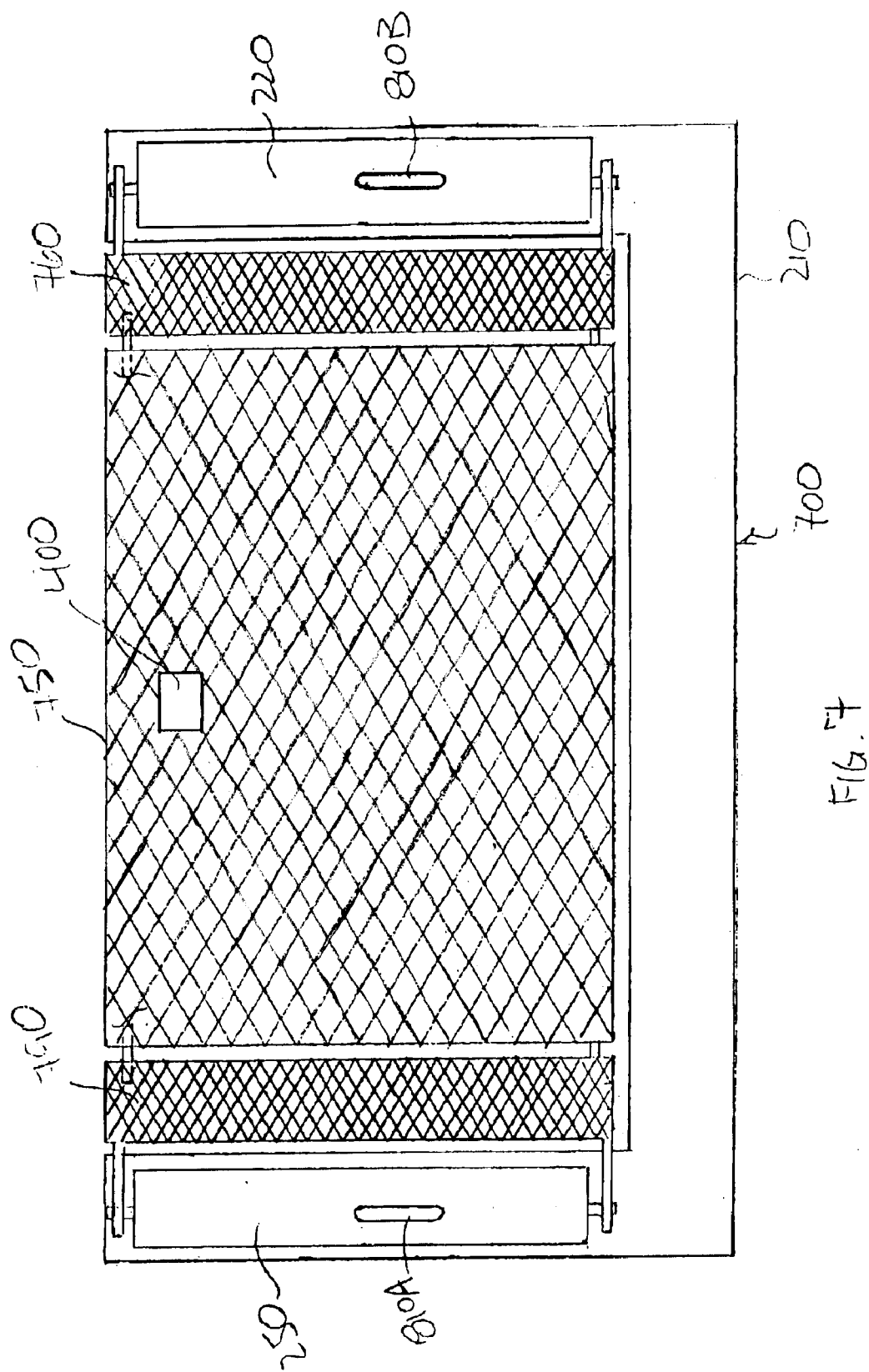

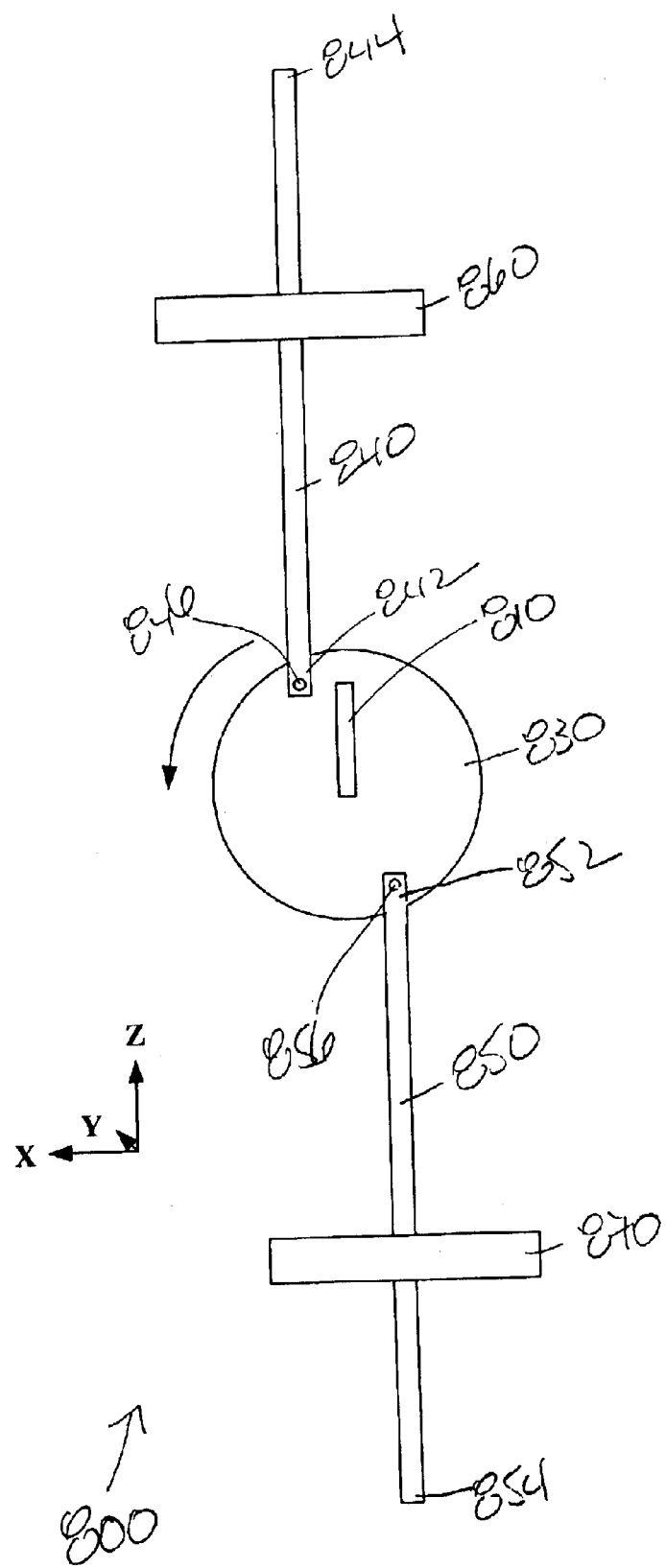

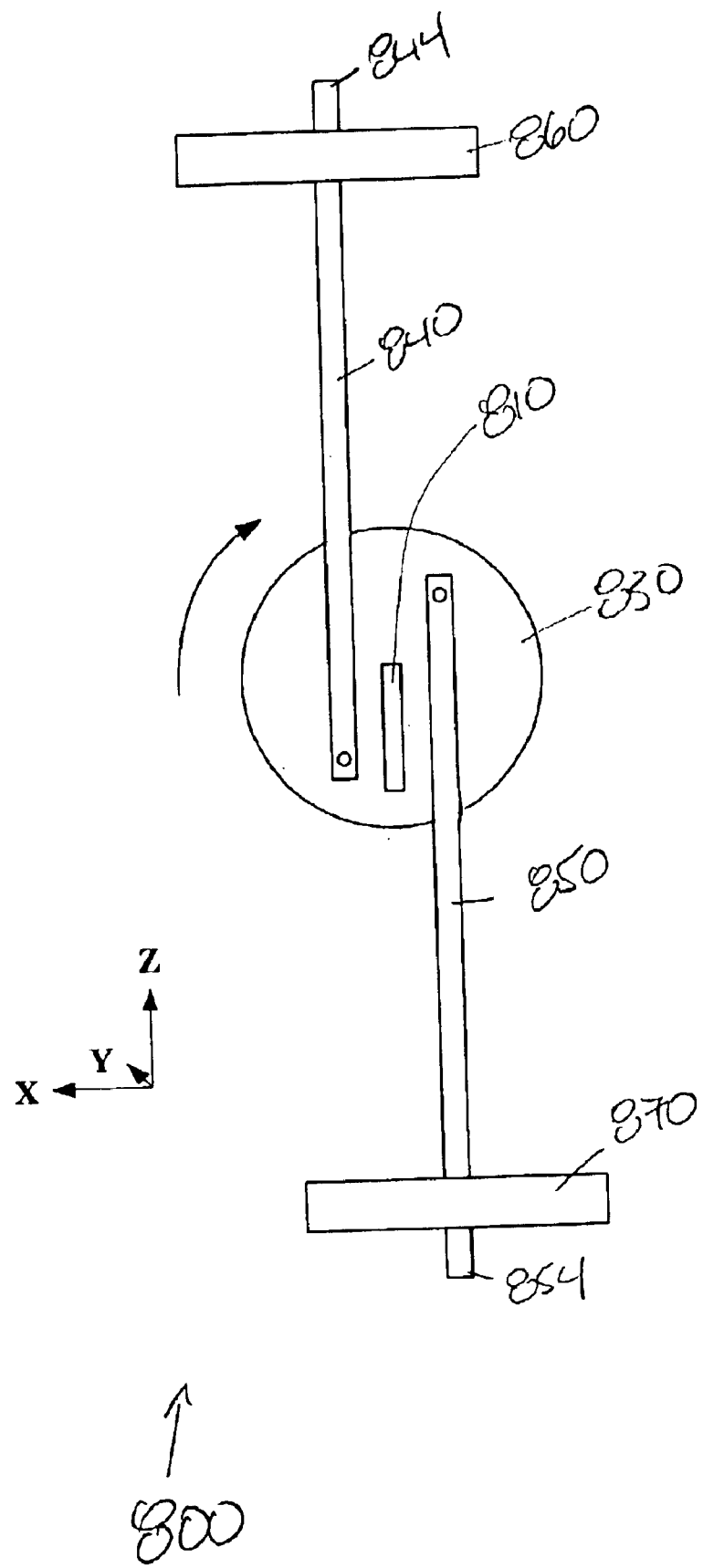

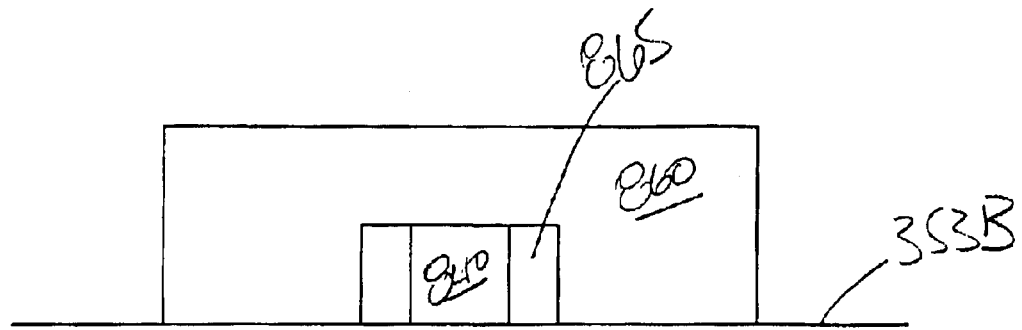
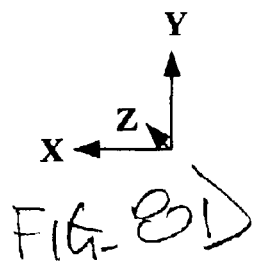
FIG-8D
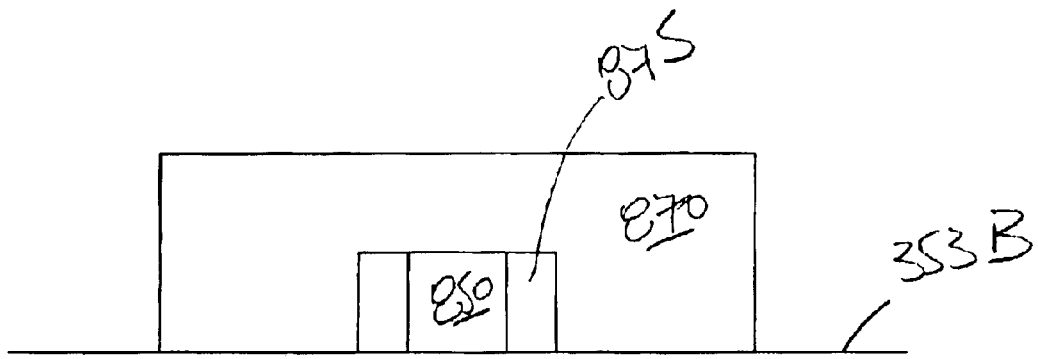
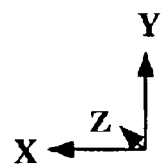
FIG 8E

FIVE POSITION TAILGATE ASSEMBLY

RELATED APPLICATION

This application is a Continuation In Part of the application having Ser. No. 09/924,796 filed Aug. 8, 2001, now abandoned.

FIELD OF THE INVENTION

The present invention relates to truck bed tailgate barriers and more particularly to a tailgate assembly that can be conveniently configured by a single user to employ one of five different orientations.

BACKGROUND OF THE INVENTION

Conventional tailgates for pickup trucks are limited to two different orientations, namely a closed position and an open position wherein the tailgate is rotated about 90 degrees around a horizontal axis. Certain prior art tailgates allow rotation around a horizontal axis as well as rotation around a vertical axis. Many pickup truck users, however, would prefer using a tailgate assembly that allows a single user to conveniently configure that tailgate assembly to employ one of five different orientations, namely a closed position, rotation of the tailgate assembly up to about 90 degrees around a horizontal axis, rotation of the tailgate assembly up to around 180 degrees around a first vertical axis disposed on a first side of the pickup truck bed, rotation of the tailgate assembly up to around 180 degrees around a second vertical axis disposed on a second side of the pickup truck bed, and removal of the door portion of the tailgate assembly.

SUMMARY OF THE INVENTION

Applicants' invention includes a tailgate assembly comprising a frame disposed in the open end of a pickup truck bed, where that frame includes a first vertical member and a second vertical member joined by a horizontal member. A first side member is pivotably connected to the first vertical member and a second side member is pivotably connected to the second vertical member. A door assembly is rotatably connected to the first side member and to the second side.

BRIEF DESCRIPTION OF THE DRAWINGS

The invention will be better understood from a reading of the following detailed description taken in conjunction with the drawings in which like reference designators are used to designate like elements, and in which:

FIG. 2A shows a front view of a first embodiment of Applicant's tailgate assembly in a first, i.e. closed, orientation;

FIG. 2C shows a front view of a first portion of Applicants' tailgate assembly;

FIG. 3 shows a perspective view of Applicant's tailgate assembly in a second orientation wherein the door assembly portion is rotated about 90 degrees around a horizontal axis;

FIG. 5 shows a perspective view of Applicant's tailgate assembly in a fourth orientation wherein the door assembly is rotated about 180 degrees around a second vertical axis;

FIG. 6 shows a perspective view of Applicant's tailgate assembly in a fifth orientation wherein the door assembly is removed from the frame portion;

FIG. 7 shows a second embodiment of Applicant's tailgate assembly;

FIG. 8A shows a top view of the components of Applicants' latching mechanism in a first, i.e. latched, orientation;

FIG. 8B shows a top view of the components of Applicants' latching mechanism in a second, i.e. unlatched, orientation;

FIG. 8D shows a side view of certain of the components of Applicants' latching mechanism; and FIG. 8E shows a side view of certain of the components of Applicants' latching mechanism.

DETAILED DESCRIPTION OF THE PREFERRED EMBODIMENTS

Figure 1:
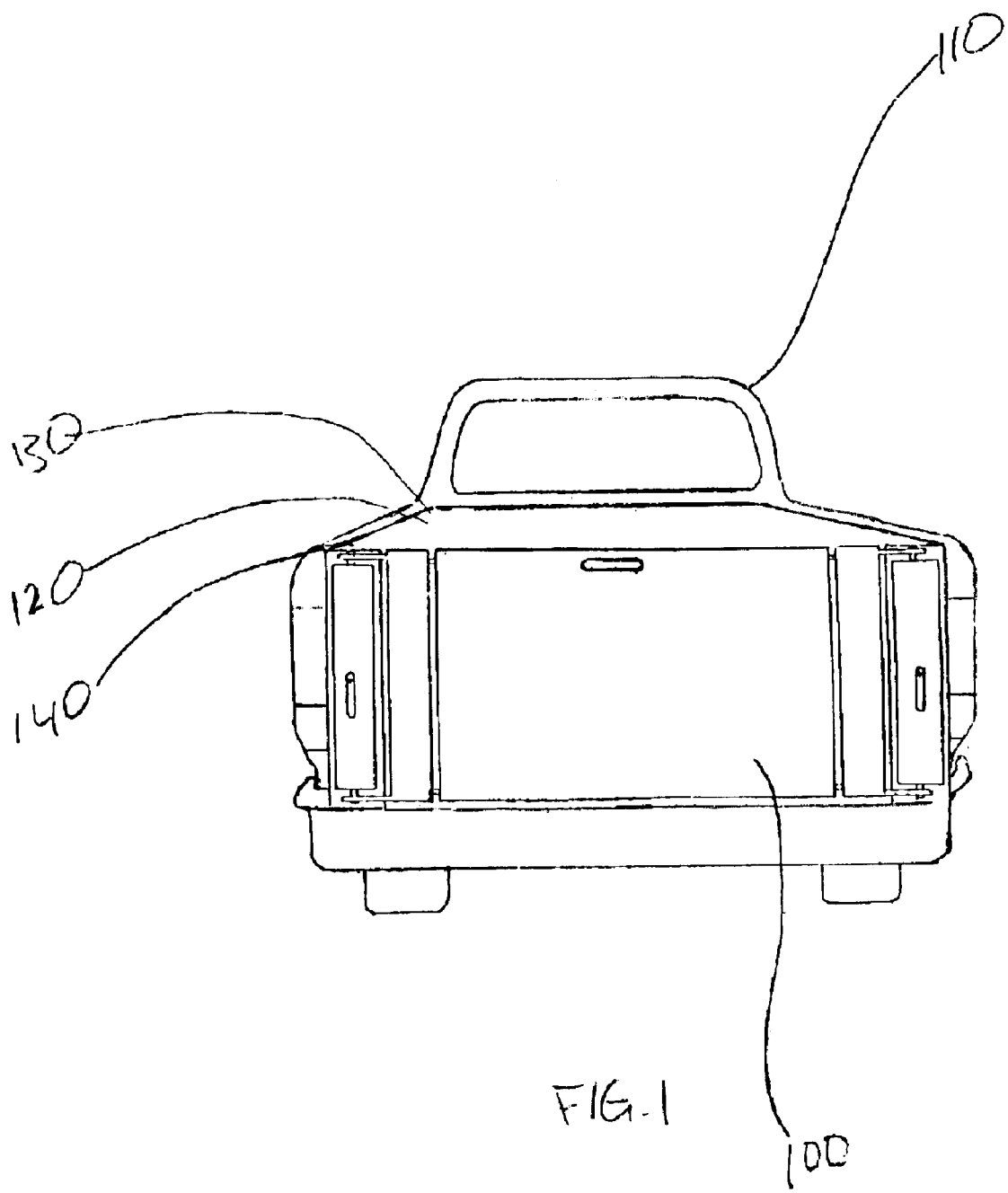
FIG. 1 is a perspective view of the rear end of a pickup truck showing Applicant's tailgate assembly disposed in the open end of the pickup truck's bed.

FIG. 1 shows a rear perspective view of pickup truck 110. Truck 110 includes bed portion 120 which comprises closed end 130 and open end 140. Applicant's tailgate assembly 100 is removeably disposed in open end 140 of bed 120.

Referring to FIG. 2A, assembly 100 is shown in a first configuration wherein door assembly 350 is in a closed position. Assembly 100 includes frame 210 which comprises horizontal member 212 and vertical members 214 and 216. Side latching assembly 220 is disposed on vertical member 214. The dimensions of frame 210, i.e. the lengths and widths of horizontal member 212, vertical member 214, and vertical member 216 are selected such that frame 210 fits within open end 140 (FIG. 1) of bed 120 (FIG. 1).

Figure 8C:
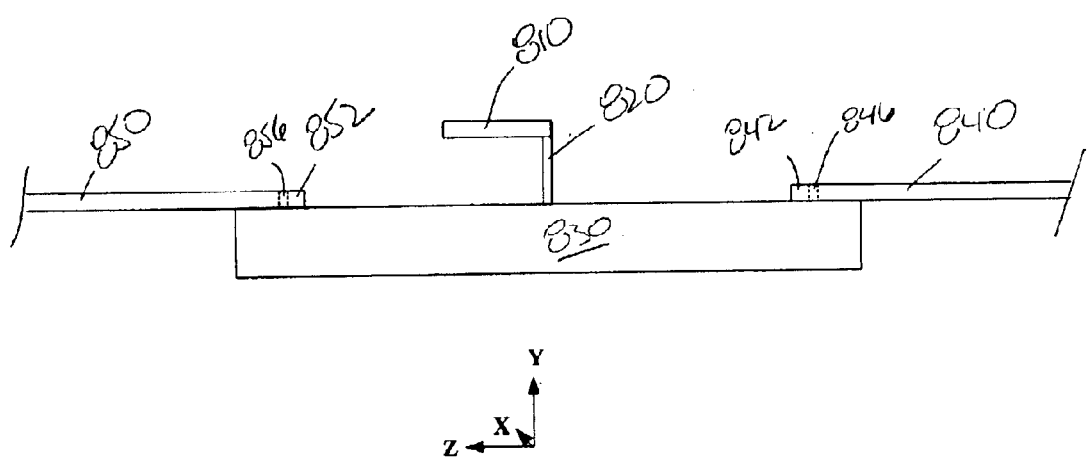
FIG. 8C shows a side view of certain of the components of Applicants' latching mechanism.

FIGS. 8A–8E illustrate the components of Applicants' latching mechanism 800. Referring now to FIG. 8A, latching mechanism 800 includes handle 810 (FIGS. 8A, 8B, 8C), connecting rod 820 (FIG. 8C), rotatable plate 830 (FIGS. 8A, 8B, 8C), latching rod 840 (FIGS. 8A, 8B, 8C, 8D), latching rod 850 (FIGS. 8A, 8B, 8C, 8E), U-bracket 860 (FIGS. 8A, 8B, 8D), and U-bracket 870 (FIGS. 8A, 8B, 8E).

Handle 810 is attached to a first end of connecting rod 820 and rotatable plate 830 is attached to the opposing end of connecting rod 820. Connecting rod 820 extends through surface 351 of door mechanism 350 such that handle 810 is disposed external to door assembly 350 and such that rotatable plate 830 is internally disposed within door assembly 350. Rotatable plate 830 is rotatably attached to inner surface 353B (FIGS. 8D, 8E) of door assembly 350.

Referring to FIGS. 8A, 8B, and 8D, latching rod 840 is pivotably attached to plate 830 at attachment point 846. Latching rod 840 extends outwardly from plate 830 in the +Z direction. Latching rod 840 extends slidingly through U-bracket 860. U-bracket 860 is attached to inner surface 353B of door assembly 350 to form channel 865. Latching rod 840 extends slidingly through channel 865 such that latching rod 840 can move along surface 353B in the +Z, -Z, +X, and -X directions.

Referring to FIGS. 8A, 8B, and 8E, latching rod 850 is pivotably attached to plate 830 at attachment point 856. Latching rod 850 extends outwardly from plate 830 in the -Z direction. Latching rod 850 extends slidingly through U-bracket 870. U-bracket 870 is attached to inner surface 353B of door assembly 350 to form channel 875. Latching rod 850 extends slidingly through channel 875 such that latching rod 850 can move along surface 353B in the +Z, −Z, +X, and −X directions.

FIG. 8A shows latching rods 840 and 850 in a first orientation wherein distal ends 844 and 854 of latching rods 840 and 850, respectively, are maximally extended. Rotation of handle 810, and thereby rotation of plate 830, in the X/Z plane around the Y axis in the counterclockwise direction moves latching rods to a second orientation shown in FIG. 8B. In the orientation of FIG. 8B, latching rods 840 and 850 have been retracted such that distal end 844 is moved in the −Z direction with respect to the first orientation of FIG. 8A, and distal end 854 is moved in the +Z direction with respect to the first orientation of FIG. 8A. Rotation of handle 810 in the X/Z plane around the Y axis in a clockwise direction moves latching rods from the second orientation of FIG. 8B to the first orientation of FIG. 8A.

Referring to FIG. 2A, one embodiment of door assembly 350 includes latching mechanism 800A which includes the elements of latching assembly 800. Side latching assembly 220 includes latching mechanism 800B which includes the elements of assembly 800. Side latching assembly 250 includes latching mechanism 800C which includes the elements of assembly 800.

Referring now to FIGS. 2A and 2C, side latching assembly 220 is disposed on vertical member 214. Side latching assembly 220 includes latching mechanism 800B which is formed as described above with respect to latching assembly 800. Rotation of handle 810B, as described above with respect to handle 810 (FIGS. 8A, 8B, 8C), causes extension or retraction of distal ends 844B and 854B, as described above with respect to distal ends 844 (FIGS. 8A, 8B) and 854 of latching rods 840 and 850 (FIGS. 8A, 8B), respectively.

Side member 260 includes first side 264, opposing second side 266, top portion 262, and bottom portion 268. Flange 270 includes proximal end 272 and distal end 274. Proximal end 272 is disposed on first side 264 of side member 260 adjacent top portion 262. Distal end 274 extends outwardly from first side 264 and includes aperture 276. Flange 280 includes proximal end 282 and distal end 284. Proximal end 282 is disposed on first side 264 of side member 260 adjacent bottom portion 268. Distal end 284 extends outwardly from first side member 264 and includes aperture 286 (not shown in FIG. 2C).

Side latching assembly 220 and side member 260 and are positioned such that distal end 844B extends through aperture 276, and such that distal end 854B extends through aperture 286, when handle 810B is in the first orientation, or latched position, shown in FIGS. 2A, 2C, and 8A. Side latching assembly 220 and side member 260 are further positioned such that distal end 844B does not extend through aperture 276, and such that distal end 854B does not extend through aperture 286, when handle 810B is in the second orientation, or unlatched position, shown in FIGS. 4, 6, and 8B.

Figure 2B:
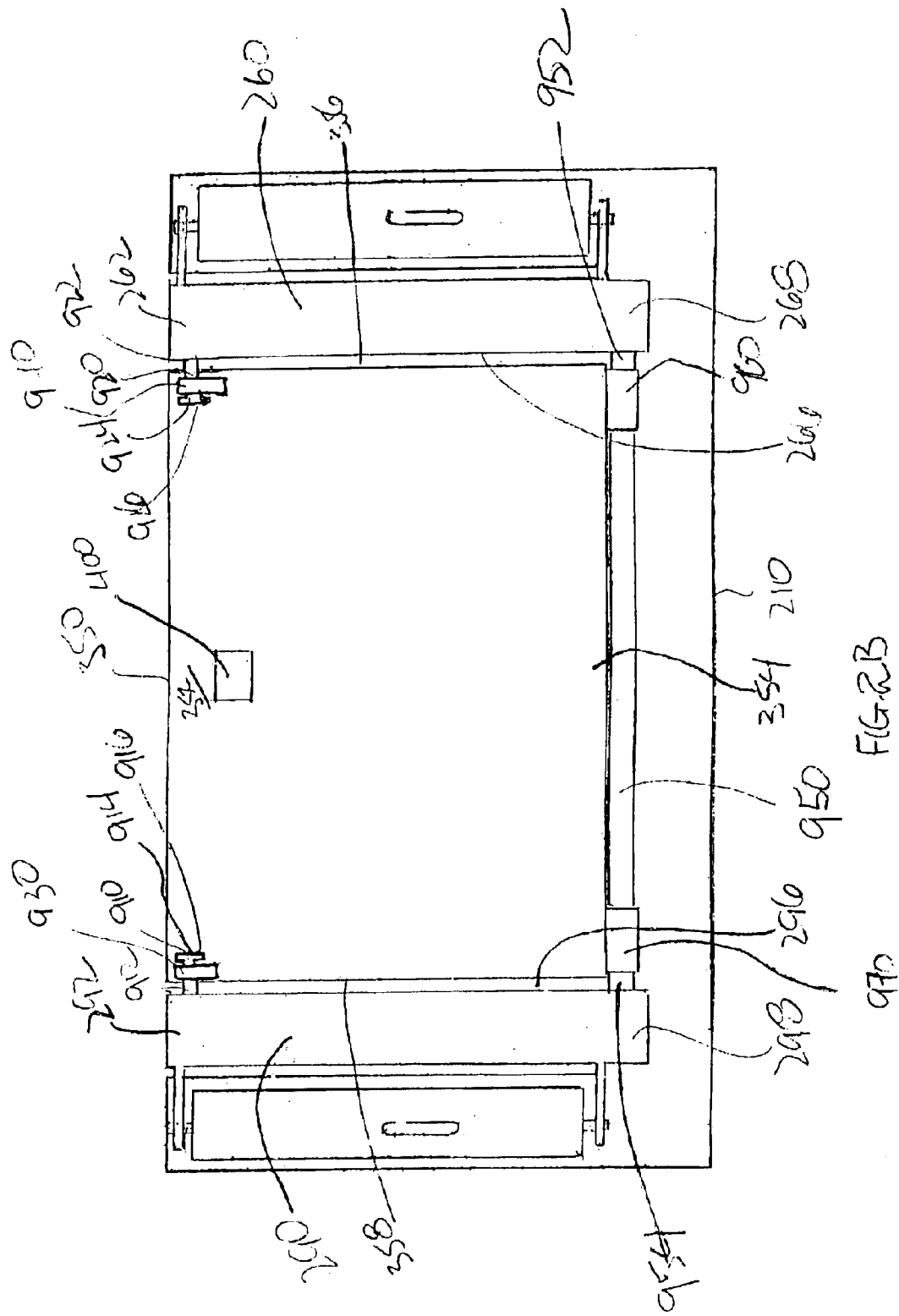
FIG. 2B shows a front view of a second embodiment of Applicant's tailgate assembly in a first, i.e. closed, orientation.
Figure 2D:
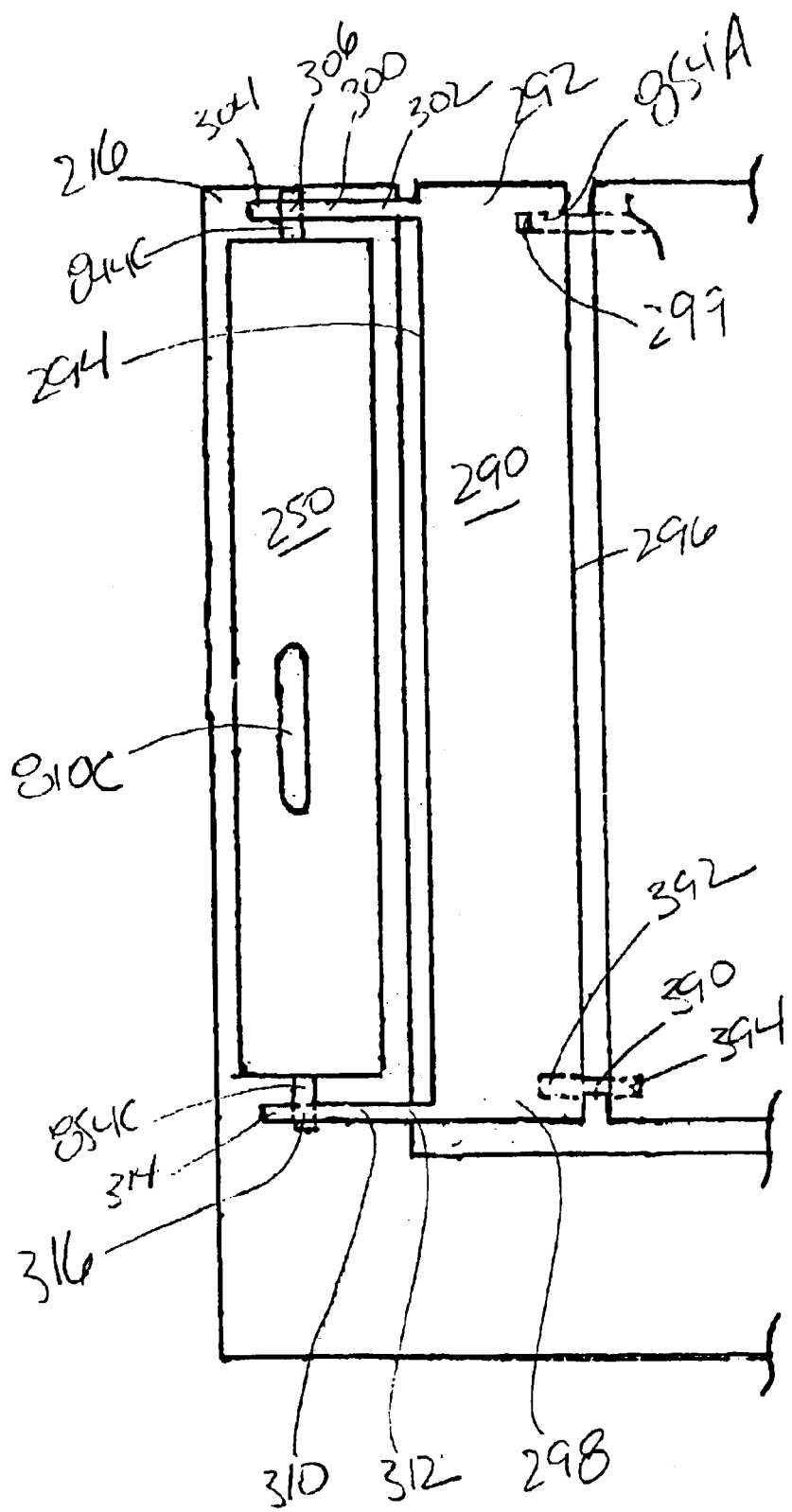
FIG. 2D shows a front view of a second portion of Applicants' tailgate assembly.

Referring now to FIGS. 2A and 2D, side latching assembly 250 is disposed on vertical member 216. Side latching assembly 250 includes latching mechanism 800C which is formed as described above with respect to latching assembly 800. Rotation of handle 810C as described above with respect to handle 810, causes extension or retraction of distal ends 844C and 854C as described above with respect to distal ends 844 and 854 of latching rods 840 and 850, respectively.

Side member 290 includes first side 294, opposing second side 296, top portion 292, and bottom portion 298. Flange 300 includes proximal end 302 and distal end 304. Proximal end 302 is disposed on first side 294 of side member 290 adjacent top portion 292. Distal end 304 extends outwardly from first side 294 and includes aperture 306 (not shown in FIG. 2). Flange 310 includes proximal end 312 and distal end 314. Proximal end 312 is disposed on first side 294 of side member 290 adjacent bottom portion 298. Distal end 314 extends outwardly from first side 294 and includes aperture 316. Side latching assembly 250 and side member 290 are disposed such that distal end 844C extends through aperture 306, and such that distal end 854C extends through aperture 316, when handle 810C is in the first, or latched position shown in FIGS. 2A, 2D, and 8A. Side latching assembly 250 and side member 290 are further disposed such that distal end 844C does not extend through aperture 306, and such that distal end 854C does not extend through aperture 316, when handle 810C is in the second, or unlatched position shown in FIGS. 5, 6, and 8B.

Referring now to FIG. 2A, door assembly 350 comprises a six-sided parallelepiped which includes top 352, bottom 354, side 356, side 358, side 351, side 353, wherein side 353 includes outer surface 353A (FIG. 3) and inner surface 353B (FIGS. 8D, 8E). Door assembly 350 is rotatably attached to side member 260 (FIGS. 2A, 2C) by rod 380 (FIGS. 2A, 2C). Rod 380 includes first end 382 (FIGS. 2A, 2C) and second end 384 (FIGS. 2A, 2C). First end 382 is rotatably disposed in second side 266 (FIG. 2C) of side member 260 adjacent bottom portion 268 (FIG. 2B). Second end 384 is attached to side 356 (FIG. 2A) of door assembly 350 adjacent bottom 354 (FIG. 2A).

Door assembly 350 is rotatably attached to side member 290 (FIGS. 2A, 2D) by rod 390 (FIGS. 2A, 2D). Rod 390 includes first end 392 (FIGS. 2A, 2D) and second end 394 (FIGS. 2A, 2D). First end 392 is rotatably disposed in second side 296 (FIG. 2D) of side member 290 adjacent bottom portion 298 (FIG. 2D). Second end 394 is attached to side 358 (FIG. 2A) of door assembly 350 adjacent bottom 354 (FIG. 2A).

In one embodiment, door assembly 350 includes Applicants' latching assembly 800A. Latching assembly 800A includes the elements of latching assembly 800 (FIGS. 8A–8E). Side member 260 includes aperture 269 (FIG. 2C) formed in side 266 (FIG. 2C) adjacent top portion 262 (FIG. 2C). Door assembly 350 and side member 260 are disposed such that when handle 810A is in the first orientation, i.e. the latched position, shown in FIGS. 2A and 8A, distal end 844A extends into aperture 269. Door assembly 350 and side member 260 are further disposed such that when handle 810A is in the second orientation, i.e. the unlatched position, shown in FIGS. 3 and 8B, distal end 844A does not extend into aperture 269.

Side member 290 includes aperture 299 (FIG. 2D) formed in side 296 (FIG. 2D) adjacent top portion 292 (FIG. 2D). Door assembly 350 and side member 290 are disposed such that when handle 810A is in the first orientation, i.e. the latched position, shown in FIGS. 2A and 8A, distal end 854A (FIG. 2D) extends into aperture 299. Door assembly 350 and side member 290 are further disposed such that when handle 810A is in the second orientation, i.e. the unlatched position, shown in FIGS. 3 and 8B, distal end 854A does not extend into aperture 299.

FIG. 2B shows a second embodiment of Applicants' tailgate assembly. This embodiment includes a pair of closure mechanisms each of which includes a forked rotary latch in combination with a mating striker plate. The forked rotary latch is held in the closed position by a catch. When handle 400 is in the closed position, that catch mechanism causes each forked rotary latch to lock securely around the associated striker plate. When handle 400 is in the open position, the two catch mechanisms are released, and each of the two forked rotary latches are uncoupled from their respective striker plates. U.S. Pat. No. 4,036,517 teaches such a releaseable latching mechanism comprising such a forked rotary latch and associated striker plate, and is hereby incorporated by reference.

Referring to FIG. 2B, proximal end 912 of striker plate 910 is disposed on side 296 adjacent top 292 of side member 290. Distal end 914 of striker plate 910 extends outwardly from side 296. Flange 916 is disposed on distal end 914 of striker plate 910. Proximal end 922 of striker plate 920 is disposed on side 266 adjacent top 262 of side member 260. Distal end 924 of striker plate 920 extends outwardly from side 266. Flange 926 is disposed on distal end 924 of striker plate 920.

Forked rotary latch 930 is internally disposed within door assembly 350 adjacent side 358 and adjacent top 352. Forked rotary latch 940 is internally disposed within door assembly 350 adjacent side 356 and adjacent top 352. In this embodiment, side 353 (FIG. 3) of door assembly 350 includes aperture 450 (FIG. 3) which exposes forked rotary latch 930. Similarly, side 353 of door assembly 350 includes aperture 460 (FIG. 3) which exposes forked rotary latch 940.

The embodiment shown in FIG. 2B further includes cylindrical member 950. First end 952 of cylindrical member 950 is attached to side 266 of side member 260 adjacent bottom portion 268. Second end 954 is attached to side 296 of side member 290 adjacent bottom portion 298. Annular member 960 is disposed on bottom portion 354 of door assembly 350 adjacent side 356. Annular member 960 is slidingly disposed around first end 952 of cylindrical member 950. Annular member 970 is disposed on bottom portion 354 of door assembly 350 adjacent side 358. Annular member 970 is slidingly disposed around second end 954 of cylindrical member 950. When forked rotary latch 930 is uncoupled from striker plate 910, and when forked rotary latch 940 is uncoupled from striker plate 920, door assembly 350 can rotate around cylindrical member 950 from the closed position shown in FIG. 2B to the open position shown in FIG. 3.

FIG. 7 shows an alternative embodiment of Applicant's tailgate assembly. Assembly 700 includes side member 760 which comprises a perforate structure. Mesh-like perforate structure 760 is formed from wood, plastic, metal, and combinations thereof. Assembly 700 further includes door assembly 750 which comprises a perforate structure. Mesh-like perforate structure 750 is formed from wood, plastic, metal, and combinations thereof. Assembly 700 includes side member 790 which comprises a perforate structure. Mesh-like perforate structure 790 is formed from wood, plastic, metal, and combinations thereof.

In the embodiment shown in FIG. 7, the side members and the door assembly comprises perforate structures. In alternative embodiments, Applicant's tailgate assembly includes perforate door assembly 750 in combination with non-perforate side members 260 (FIG. 2) and 290 (FIG. 2). In yet other embodiments, Applicant's tailgate assembly comprises non-perforate door assembly 350 (FIG. 2) in combination with perforate side members 760 and 790.

FIG. 3 shows a second orientation of Applicant's tailgate assembly. In this second orientation, handle 810A (FIG. 2A) is rotated to the second orientation thereby causing distal ends 844A (FIGS. 2A, 2C) and 854A (FIGS. 2A, 2D) to retract and allow door assembly 350 (FIG. 2) to rotate around rods 380 (FIGS. 2A, 2C) and 390 (FIGS. 2A, 2D) to the open position shown in FIG. 3. The rotation of door assembly 350 is limited by the lengths of flexible lines 410 and 420. The lengths of flexible lines 410 and 420 are adjusted such that door assembly 350 can rotate about 90 degrees from the closed position shown in FIG. 2A. Flexible lines 410 and 420 are formed from plastic, metal, and combinations thereof. In certain embodiments, lines 410 and 420 comprise a single extruded strand of plastic and/or metal. In alternate embodiments, lines 410 and 420 comprise multiple strands of plastic and/or metal.

Flexible line 410 includes proximal end 412 and distal end 414. Proximal end 412 is attached to side 296 (FIGS. 2D, 3) of side member 290 (FIGS. 2A, 2D, 3) adjacent top 292 (FIGS. 2A, 3). Distal end 414 is attached to side 358 (FIGS. 2A, 3) of door assembly 350 (FIGS. 2A, 3) adjacent top portion 352 (FIGS. 2A, 3). Flexible line 420 includes proximal end 422 and distal end 424. Proximal end 422 is attached to side 266 (FIG. 2D) of side member 260 (FIGS. 2A, 2C, 3) adjacent top 262 (FIGS. 2A, 3). Distal end 424 is attached to side 356 (FIGS. 2A, 3) of door assembly 350 (FIGS. 2A, 3) adjacent top portion 352 (FIGS. 2A, 3).

A single user can conveniently convert the first position of Applicant's tailgate assembly shown in 2A to the position shown in FIG. 3 by simply rotating handle 810A to retract distal ends 844A (FIG. 2A) and 854A (FIG. 2A), and then rotating door assembly 350 about 90 degrees around pins 380 and 390. That single user need only guide door assembly 350 downwardly until flexible lines 410 and 420 support the weight of that door assembly.

Figure 4:
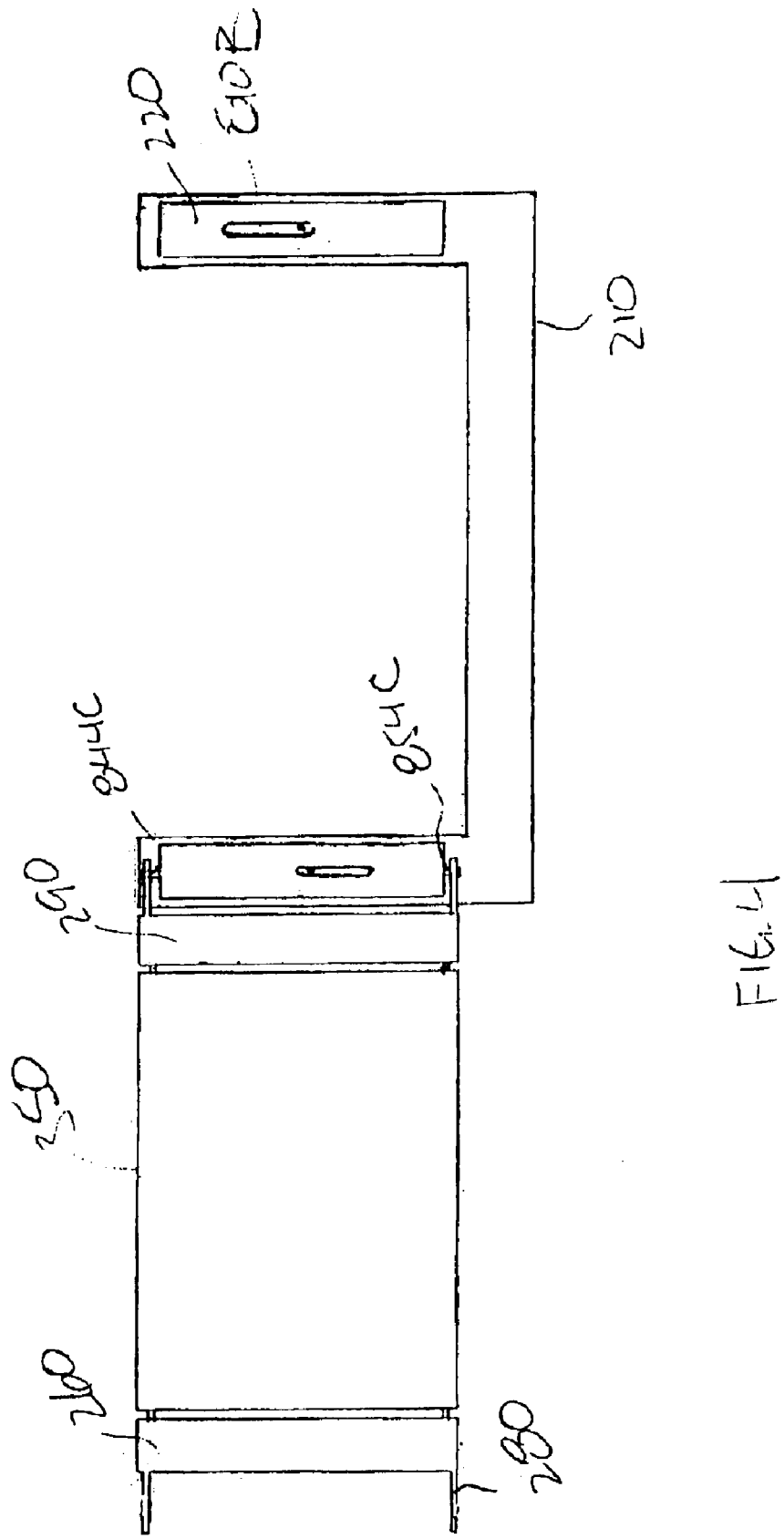
FIG. 4 shows a perspective view of Applicant's tailgate assembly in a third orientation wherein the door assembly is rotated about 180 degrees around a first vertical axis.

FIG. 4 shows a third orientation of Applicant's tailgate assembly 100 wherein handle 810B has been placed in the second, or open position, thereby retracting distal ends 844B (FIGS. 2A, 2C) and 854B (FIGS. 2A, 2C). With distal ends 844B and 854B retracted, door assembly 350 can rotate around distal ends 844C (FIGS. 2A, 2D, 4) and 854C (FIGS. 2A, 2D, 4) up to about 180 degrees from the closed position shown in FIG. 2A. A single user can conveniently convert the first orientation of Applicant's tailgate assembly 100 shown in FIG. 2 to the third orientation shown in FIG. 4 by rotating handle 810B to the second position and rotating door assembly 350 around distal ends 844C and 854C to the open position shown in FIG. 4.

FIG. 5 shows a fourth orientation of Applicant's tailgate assembly 100 wherein handle 810C has been placed in the second, or open position, thereby retracting latching pins 844C (FIGS. 2A, 2D) and 854C (FIGS. 2A, 2D). With distal ends 844C and 854C retracted, door assembly 350 can rotate around distal ends 844B (FIGS. 2A, 2C, 4) and 854B (FIGS. 2A, 2C, 4) up to about 180 degrees from the closed position shown in FIG. 2A A single user can conveniently convert the first orientation of Applicant's tailgate assembly 100 shown in FIG. 2A to the fourth orientation shown in FIG. 5 by rotating handle 810C to the second position and rotating door assembly 350 around distal ends 844C and 854C to the open position shown in FIG. 4.

FIG. 6 shows a fifth orientation of Applicant's tailgate assembly 100 wherein both handle 810B and handle 810C have been placed in the second, or open, position, thereby retracting distal ends 844B, 854B, 844C, and 854C. Retracting distal ends 844B, 854B, 844C, and 854C releases the unit formed from side member 260, door assembly 350, and side member 290. FIG. 6 shows the orientation of assembly

100 wherein that side member 260/door assembly 350/side member 290 combination has been removed thereby allowing access to open end 140 (FIG. 1) of bed 120 (FIG. 1). A single user can conveniently convert the first orientation of Applicant's tailgate assembly 100 shown in FIG. 2A to the fifth orientation shown in FIG. 6 by rotating handles 810B and 810C to the second position and removing the door assembly 350/first side member 220/second side member 250 combination from frame 210.

While the preferred embodiments of the present invention have been illustrated in detail, it should be apparent that modifications and adaptations to those embodiments may occur to one skilled in the art without departing from the scope of the present invention as set forth in the following claims.

We claim:

1. A tailgate assembly for use in a pickup truck, wherein said pickup truck comprises a bed having a closed end and an open end, comprising:
   a frame disposed in said open end of said bed, wherein said frame comprises a first vertical member and a second vertical member joined by a horizontal member;
   a first side member pivotably connected to said first vertical member;
   a second side member pivotably connected to said second vertical member;
   a door assembly, wherein said door assembly is rotatably connected to said first side member, and wherein said door assembly is rotatably connected to said second side member;
   wherein said door assembly in combination with said first side member and said second side member is removeably attached to said frame.

2. The tailgate assembly of claim 1, wherein said door assembly comprises a rectangular parallelepiped comprising a first vertical side and an opposing second vertical side, a third vertical side and an opposing fourth vertical side, and wherein said second vertical side faces said pickup bed, said tailgate assembly further comprising:
   a first connecting rod, having a first end and a second end, wherein said first end of said first connecting rod extends through said first vertical side of said door assembly;
   a first handle attached to said first end of said first connecting rod, wherein said first handle is rotatable between a first position and a second position;
   a first rotatable plate disposed within said door assembly, wherein said second end of said first connecting rod is attached to said first rotatable plate;
   a first latching rod having a proximal end and a distal end, wherein said proximal end of said first latching rod is rotatably attached to said first rotatable plate, and wherein said distal end of said first latching rod extends outwardly from said third vertical side of said door assembly when said first handle is in said first position, and wherein said distal end of said first latching rod does not extend outwardly from said third vertical side of said door assembly when said first handle is in said second position;
   a second latching rod having a proximal end and a distal end, wherein said proximal end of said second latching rod is rotatably attached to said first rotatable plate, and wherein said distal end of said second latching rod extends outwardly from said fourth vertical side of said door assembly when said first handle is in said first position, and wherein said distal end of said second latching rod does not extend outwardly from said fourth vertical side of said door assembly when said first handle is in said second position.

3. The tailgate assembly of claim 2, further comprising a first side latching assembly, wherein said first side latching assembly comprises a rectangular parallelepiped comprising a first vertical side and an opposing second vertical side, a first horizontal side and an opposing second horizontal side, and wherein said second vertical side is disposed on said first vertical member, said tailgate assembly further comprising:
   a second connecting rod, having a first end and a second end, wherein said first end of said second connecting rod extends through said first side of said first side latching assembly;
   a second handle attached to said first end of said second connecting rod, wherein said second handle is rotatable between a first position and a second position;
   a second rotatable plate disposed within said first side latching assembly, wherein said second end of said second connecting rod is attached to said second rotatable plate;
   a third latching rod having a proximal end and a distal end, wherein said proximal end of said third latching rod is rotatably attached to said second rotatable plate, and wherein said distal end of said third latching rod extends outwardly from said first horizontal side of said first side latching assembly when said second handle is in said first position, and wherein said distal end of said third latching rod does not extend outwardly from said first horizontal side of said first side latching assembly when said second handle is in said second position;
   a fourth latching rod having a proximal end and a distal end, wherein said proximal end of said fourth latching rod is rotatably attached to said second rotatable plate, and wherein said distal end of said fourth latching rod extends outwardly from said second horizontal side of said first side latching assembly when said second handle is in said first position, and wherein said distal end of said fourth latching rod does not extend outwardly from said second horizontal side of said first side latching assembly when said second handle is in said second position.

4. The tailgate assembly of claim 3, further comprising:
   a first flange having a proximal end and a distal end, wherein said proximal end of said first flange is attached to said first side member and wherein said distal end of said first flange extends outwardly toward said first side latching assembly, wherein said distal end of said first flange is formed to include a first aperture;
   a second flange having a proximal end and a distal end, wherein said proximal end of said second flange is attached to said first side member and wherein said distal end of said second flange extends outwardly toward said first side latching assembly, wherein said distal end of said second flange is formed to include a second aperture;
   wherein said first side member is disposed such that said distal end of said third latching rod extends through said first aperture when said second handle is in said first position, and wherein said distal end of said third latching rod does not extend through said first aperture when said second handle is in said second position; and
   wherein said first side member is disposed such that said distal end of said fourth latching rod extends through said second aperture when said second handle is in said first position, and wherein said distal end of said fourth latching rod does not extend through said second aperture when said second handle is in said second position.

5. The tailgate assembly of claim 3, further comprising a second side latching assembly, wherein said second side latching assembly comprises a rectangular parallelepiped comprising a first vertical side and an opposing second vertical side, a first horizontal side and an opposing second horizontal side, and wherein said second vertical side of said second side latching assembly is disposed on said second vertical member, said tailgate assembly further comprising:

a third connecting rod, having a first end and a second end, wherein said first end of said third connecting rod extends through said first side of said second side latching assembly;

a third handle attached to said first end of said third connecting rod, wherein said third handle is rotatable between a first position and a second position;

a third rotatable plate disposed within said second side latching assembly, wherein said second end of said third connecting rod is attached to said third rotatable plate;

a fifth latching rod having a proximal end and a distal end, wherein said proximal end of said fifth latching rod is rotatably attached to said third rotatable plate, and wherein said distal end of said fifth latching rod extends outwardly from said first horizontal side of said second side latching assembly when said third handle is in said first position, and wherein said distal end of said fifth latching rod does not extend outwardly from said first horizontal side of said second side latching assembly when said third handle is in said second position;

a sixth latching rod having a proximal end and a distal end, wherein said proximal end of said sixth latching rod is rotatably attached to said third rotatable plate, and wherein said distal end of said sixth latching rod extends outwardly from said second horizontal side of said second side latching assembly when said third handle is in said first position, and wherein said distal end of said sixth latching rod does not extend outwardly from said second horizontal side of said second side latching assembly when said third handle is in said second position.

6. The tailgate assembly of claim 5, further comprising:

a third flange having a proximal end and a distal end, wherein said proximal end of said third flange is attached to said second side member and wherein said distal end of said third flange extends outwardly toward said second side latching assembly, wherein said distal end of said third flange is formed to include a third aperture;

a fourth flange having a proximal end and a distal end, wherein said proximal end of said fourth flange is attached to said second side member and wherein said distal end of said second flange extends outwardly toward said second side latching assembly, wherein said distal end of said fourth flange is formed to include a fourth aperture;

wherein said second side member is disposed such that said distal end of said fifth latching rod extends through said third aperture when said third handle is in said first position, and wherein said distal end of said fifth latching rod does not extend through said third aperture when said third handle is in said second position; and wherein said second side member is disposed such that said distal end of said sixth latching rod extends through said fourth aperture when said third handle is in said first position, and wherein said distal end of said sixth latching rod does not extend through said fourth aperture when said third handle is in said second position.

7. The tailgate assembly of claim 1, wherein said door assembly comprises a perforate structure.

8. A method to gain access to a pickup truck bed, wherein said pickup truck bed includes a tailgate assembly comprising a door assembly, comprising the steps of:

rotating said door assembly up to about 90 degrees around a horizontal axis;

rotating said door assembly in a first direction up to about 180 degrees around a first vertical axis;

rotating said door assembly in a second direction up to about 180 degrees around a second vertical axis; and removing said door assembly;

wherein said tailgate assembly further comprises:

a frame disposed in said open end of said bed, wherein said frame comprises a first vertical member and a second vertical member joined by a horizontal member;

a first side member pivotably connected to said first vertical member;

a second side member pivotably connected to said second vertical member;

said door assembly, wherein said door assembly is rotatably connected to said first vertical member and to said second vertical member; and wherein said door assembly in combination with said first side member and said second side member is removeably attached to said frame.

9. The method of claim 8, wherein said door assembly comprises a rectangular parallelepiped comprising a first vertical side and an opposing second vertical side, a third vertical side and an opposing fourth vertical side, and wherein said second vertical side faces said pickup bed, said tailgate assembly further comprising:

a first connecting rod, having a first end and a second end, wherein said first end of said first connecting rod extends through said first side of said door assembly;

a first handle attached to said first end of said first connecting rod, wherein said first handle is rotatable between a first position and a second position;

a first rotatable plate disposed within said door assembly, wherein said second end of said first connecting rod is attached to said first rotatable plate;

a first latching rod having a proximal end and a distal end, wherein said proximal end of said first latching rod is rotatably attached to said first rotatable plate, and wherein said distal end of said first latching rod extends outwardly from said third side of said door assembly when said first handle is in said first position, and wherein said distal end of said first latching rod does not extend outwardly from said third side of said door assembly when said first handle is in said second position;

a second latching rod having a proximal end and a distal end, wherein said proximal end of said second latching rod is rotatably attached to said first rotatable plate, and wherein said distal end of said second latching rod extends outwardly from said fourth side of said door assembly when said first handle is in said first position, and wherein said distal end of said second latching rod does not extend outwardly from said fourth side of said door assembly when said first handle is in said second position.

10. The method of claim 9, said tailgate assembly further comprising:

a first side latching assembly, wherein said first side latching assembly comprises a rectangular parallelepiped comprising a first vertical side and an opposing second vertical side, a first horizontal side and an opposing second horizontal side, and wherein said second vertical side is disposed on said first vertical member;

a second connecting rod, having a first end and a second end, wherein said first end of said second connecting rod extends through said first side of said first side latching assembly;

a second handle attached to said first end of said second connecting rod, wherein said second handle is rotatable between a first position and a second position;

a second rotatable plate disposed within said first side latching assembly, wherein said second end of said second connecting rod is attached to said second rotatable plate;

a third latching rod having a proximal end and a distal end, wherein said proximal end of said third latching rod is rotatably attached to said second rotatable plate, and wherein said distal end of said third latching rod extends outwardly from said first horizontal side of said first side latching assembly when said second handle is in said first position, and wherein said distal end of said third latching rod does not extend outwardly from said first horizontal side of said first side latching assembly when said second handle is in said second position;

a fourth latching rod having a proximal end and a distal end, wherein said proximal end of said fourth latching rod is rotatably attached to said second rotatable plate, and wherein said distal end of said fourth latching rod extends outwardly from said second horizontal side of said first side latching assembly when said second handle is in said first position, and wherein said distal end of said fourth latching rod does not extend outwardly from said second horizontal side of said first side latching assembly when said second handle is in said second position.

11. The method of claim 10, wherein said tailgate assembly further comprises:

a first flange having a proximal end and a distal end, wherein said proximal end of said first flange is attached to said first side member and wherein said distal end of said first flange extends outwardly toward said first side latching assembly, wherein said distal end of said first flange is formed to include a first aperture;

a second flange having a proximal end and a distal end, wherein said proximal end of said second flange is attached to said first side member and wherein said distal end of said second flange extends outwardly toward said first side latching assembly, wherein said distal end of said second flange is formed to include a second aperture;

wherein said first side member is disposed such that said distal end of said third latching rod extends through said first aperture when said second handle is in said first position, and wherein said distal end of said third latching rod does not extend through said first aperture when said second handle is in said second position; and wherein said first side member is disposed such that said distal end of said fourth latching rod extends through said second aperture when said second handle is in said first position, and wherein said distal end of said fourth latching rod does not extend through said second aperture when said second handle is in said second position.

12. The method of claim 10, wherein said tailgate assembly further comprises:

a second side latching assembly, wherein said second side latching assembly comprises a rectangular parallelepiped comprising a first vertical side and an opposing second vertical side, a first horizontal side and an opposing second horizontal side, and wherein said second vertical side of said second side latching assembly is disposed on said second vertical member;

a third connecting rod, having a first end and a second end, wherein said first end of said third connecting rod extends through said first side of said second side latching assembly;

a third handle attached to said first end of said third connecting rod, wherein said third handle is rotatable between a first position and a second position;

a third rotatable plate disposed within said second side latching assembly, wherein said second end of said third connecting rod is attached to said third rotatable plate;

a fifth latching rod having a proximal end and a distal end, wherein said proximal end of said fifth latching rod is rotatably attached to said third rotatable plate, and wherein said distal end of said fifth latching rod extends outwardly from said first horizontal side of said second side latching assembly when said third handle is in said first position, and wherein said distal end of said fifth latching rod does not extend outwardly from said first horizontal side of said second side latching assembly when said third handle is in said second position;

a sixth latching rod having a proximal end and a distal end, wherein said proximal end of said sixth latching rod is rotatably attached to said third rotatable plate, and wherein said distal end of said sixth latching rod extends outwardly from said second horizontal side of said second side latching assembly when said third handle is in said first position, and wherein said distal end of said sixth latching rod does not extend outwardly from said second horizontal side of said second side latching assembly when said third handle is in said second position.

13. The method of claim 12, wherein said tailgate assembly further comprises:

a third flange having a proximal end and a distal end, wherein said proximal end of said third flange is attached to said second side member and wherein said distal end of said third flange extends outwardly toward said second side latching assembly, wherein said distal end of said third flange is formed to include a third aperture;

a fourth flange having a proximal end and a distal end, wherein said proximal end of said fourth flange is attached to said second side member and wherein said distal end of said second flange extends outwardly toward said second side latching assembly, wherein said distal end of said fourth flange is formed to include a fourth aperture;

wherein said second side member is disposed such that said distal end of said fifth latching rod extends through said third aperture when said third handle is in said first position, and wherein said distal end of said fifth latching rod does not extend through said third aperture when said third handle is in said second position; and wherein said second side member is disposed such that said distal end of said sixth latching rod extends through said fourth aperture when said third handle is in said first position, and wherein said distal end of said sixth latching rod does not extend through said fourth aperture when said third handle is in said second position.

14. The method of claim 13, wherein said tailgate assembly comprises a perforate structure.

* * * * *